United States Patent
Meswani et al.

(10) Patent No.: US 9,983,655 B2
(45) Date of Patent: May 29, 2018

(54) METHOD AND APPARATUS FOR PERFORMING INTER-LANE POWER MANAGEMENT

(71) Applicant: Advanced Micro Devices, Inc., Sunnyvale, CA (US)

(72) Inventors: Mitesh R. Meswani, Austin, TX (US); David A. Roberts, Sunnyvale, CA (US); Dmitri Yudanov, Austin, TX (US); Arkaprava Basu, Austin, TX (US); Sergey Blagodurov, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 196 days.

(21) Appl. No.: 14/963,352

(22) Filed: Dec. 9, 2015

(65) Prior Publication Data
US 2017/0168546 A1    Jun. 15, 2017

(51) Int. Cl.
| G06F 1/00 | (2006.01) |
| G06F 1/32 | (2006.01) |
| G06F 9/38 | (2018.01) |

(52) U.S. Cl.
CPC .......... *G06F 1/3243* (2013.01); *G06F 9/3885* (2013.01)

(58) Field of Classification Search
CPC .............................. G06F 1/3278; G06F 9/3885
USPC ............... 709/231; 370/329, 235, 252, 503; 713/323; 1/1
See application file for complete search history.

(56) References Cited

U.S. PATENT DOCUMENTS

| 9,098,271 | B2* | 8/2015 | Eastlack | G06F 1/32 |
| 9,344,208 | B2* | 5/2016 | Belhadj | H04J 3/0667 |
| 2008/0307244 | A1* | 12/2008 | Bertelsen | G06F 1/3203 |
| | | | | 713/323 |
| 2009/0080339 | A1* | 3/2009 | Duffield | H04L 43/0852 |
| | | | | 370/252 |
| 2010/0074278 | A1* | 3/2010 | Dobjelevski | H04J 3/0673 |
| | | | | 370/503 |
| 2010/0254704 | A1* | 10/2010 | Aoki | H04B 10/40 |
| | | | | 398/45 |
| 2012/0137018 | A1* | 5/2012 | Uhlig | G06F 11/004 |
| | | | | 709/231 |
| 2013/0148614 | A1* | 6/2013 | Noh | H04L 5/001 |
| | | | | 370/329 |
| 2014/0355438 | A1* | 12/2014 | Gedik | H04L 12/6418 |
| | | | | 370/235 |

OTHER PUBLICATIONS

Nvidia Corporation, "Social Impact of the GPU: Doing More with Less of a Scarce Resource", available at: www.nvidia.ca/object/gcr-energy-efficiency.html, 2015 (Retrieved Dec. 5, 2015).

Intel Corporation, "Product Brief: Intel® Atom™ Processors Z2580, Z2560, and Z2520 for Smartphones and Tablets", available at: http://download.intel.com/newsroom/kits/mobileworld/2013/pdfs/Intel_Atom_Processors_Brief.pdf, 2013 (Retrieved Dec. 5, 2015).

\* cited by examiner

*Primary Examiner* — Aurel Prifti
(74) *Attorney, Agent, or Firm* — Volpe and Koenig, P.C.

(57) ABSTRACT

A method and apparatus for performing inter-lane power management includes de-energizing one or more execution lanes upon a determination that the one or more execution lanes are to be predicated. Energy from the predicated execution lanes is redistributed to one or more active execution lanes.

12 Claims, 3 Drawing Sheets

METHOD AND APPARATUS FOR PERFORMING INTER-LANE POWER MANAGEMENT

FIELD OF THE INVENTION

The present invention is generally directed to power management, and more particularly to performing inter-lane power management in a vector pipeline.

BACKGROUND

Graphics Processing Unit (GPU) architectures are suitable for delivering high throughput when all threads are executing on available lanes on the Single Instruction/Multiple Data (SIMD) units. However, during a period of divergence, such as due to control flow, some threads get predicated out. That is, those lanes become predicated out. The predicated lanes do not contribute to actual execution as results from predicated lanes are not utilized. In such predicated executions, the subsets of lanes that are active and not predicated, (i.e., active lanes), are typically running at the same performance levels as the predicated lanes, resulting in a waste of budgeted power resources.

It would therefore be beneficial to provide a method and apparatus for performing inter-lane power management.

SUMMARY OF EMBODIMENTS

An embodiment directed to a method of performing inter-lane power management is disclosed. The method includes de-energizing one or more execution lanes upon a determination that the one or more execution lanes are to be predicated. Energy from the predicated execution lanes is redistributed to one or more active execution lanes.

An embodiment directed to an apparatus is disclosed. The apparatus includes a plurality of execution lane circuits, an encoder, and one or more power steering supplies. The encoder is configured to control the one or more power steering supplies to de-energize one or more of the execution lane circuits upon a determination that the one or more execution lane circuits are to be predicated, and to redistribute energy from the predicated execution lane circuits to one or more active execution lane circuits.

An embodiment directed to non-transitory computer-readable medium is disclosed. The non-transitory computer-readable medium, having instructions recorded thereon that, when executed by a computing device, cause the computing device to perform operations including de-energizing one or more execution lanes upon a determination that the one or more execution lanes are to be predicated, and redistributing energy from the predicated execution lanes to one or more active execution lanes.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description of the embodiments is provided below, briefly a method and apparatus for performing inter-lane power management includes deactivating execution lanes that are not computing useful results and redistributing power to active execution lanes. Threads in a wavefront that are active are accelerated in a predicated execution through power steering. That is, power is redistributed away from predicated execution lanes to the active lanes and/or the clock frequency of active lanes is increased, while keeping an overall power budget constant.

Figure 1:
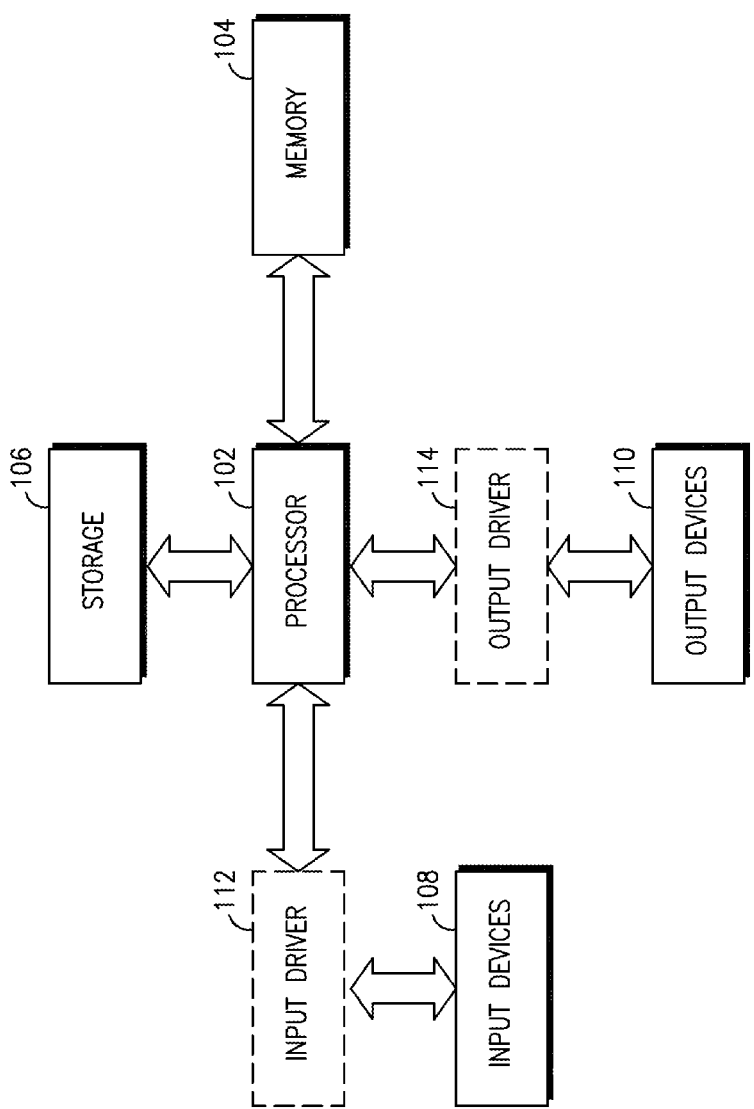
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

Figure 2:
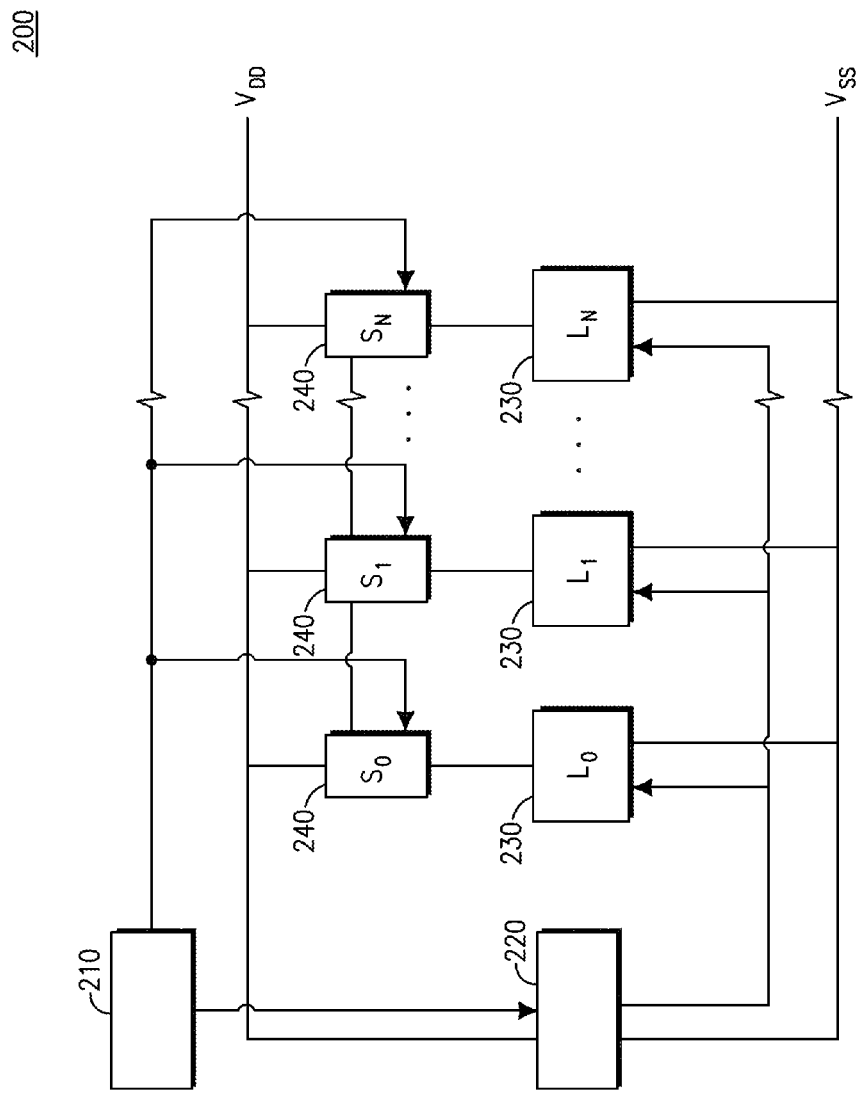
FIG. 2 is an example schematic diagram of an apparatus for performing inter-lane power management according to an embodiment.

FIG. 2 is an example schematic diagram of an apparatus 200 for performing inter-lane power management according to an embodiment. The apparatus 200 includes an encoder 210, frequency control unit 220, one or more execution lanes 230, (designated $L_0, L_1, \ldots, L_N$), and one or more power steering supplies 240, (designated $S_0, S_1, \ldots, S_N$). The encoder 210 is in communication with the ring oscillator 220 and the power steering supplies 240. The ring oscillator is connected across the rail voltage ($V_{DD}$) and the reference voltage ($V_{SS}$), and to each of the execution lanes 230. Each power steering supply 240 is connected to the rail voltage and a respective execution lane 230. For example, $S_0$ to $L_0$, and the like. In addition to being connected to a respective power steering supply 240, each execution lane 230 is connected to the reference voltage. In this manner, each execution lane 230 may be energized via its respective power steering supply 240.

The encoder 210 translates execution mask values into control signals to the frequency control unit 220, (e.g., an array of programmable logic ladders (PLLs), or ring oscillators and multiplexers), and the power steering supplies 240. Both the frequency control unit 220 and the power steering supplies 240 provide fine-grain control over power consumed by the execution lanes 230. In a case of random divergent execution, (i.e., random lanes are predicated), power may be steered from resting lanes to busy ones as dictated by the encoder 210, frequency control unit 220 and power steering supplies 240. This may reduce current spikes to the system. Therefore, the power rails, (i.e., the rail voltage across $V_{DD}$ to $V_{SS}$), get less pressure and are less stressed.

At the same time, certain regions of code may demand more power, (e.g., all lanes are busy), and other regions of code may demand less power, (e.g., only a few lanes are busy). In this case, the transition from one behavior to another requires power control for a region of lanes, (e.g., Single Instruction/Multiple Data (SIMD) units). In this case, the regional power supply, (i.e., the one that provides the regional $V_{DD}$-$V_{SS}$ power), may be informed by the encoder 210. This may be utilized if the execution masks can be pipelined, predicted or informed from an instruction buffer by special instructions. Accordingly, if values of masks are known ahead of time, the encoder 210 can forecast a regional power budget and inform the regional power supply, providing it with time to react.

Figure 3:
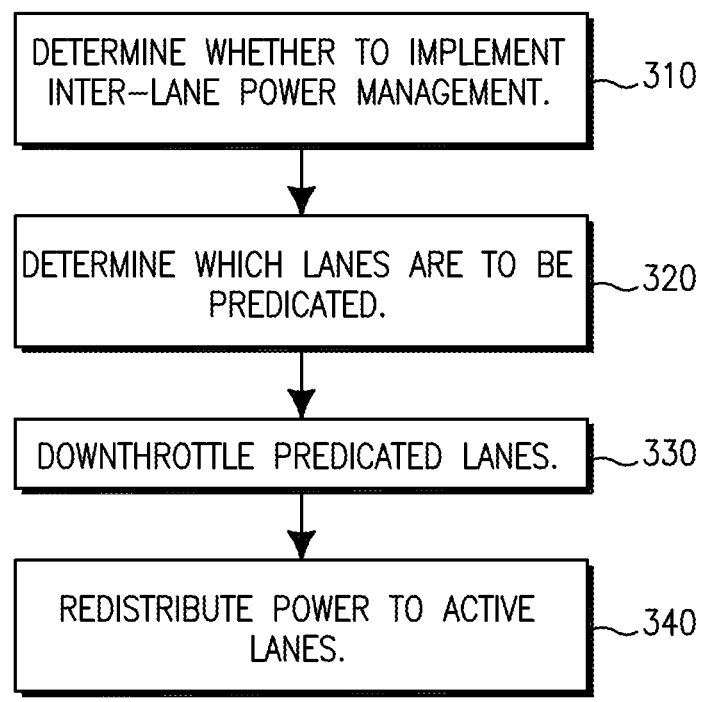
FIG. 3 is a flow diagram of an example method of performing inter-lane power management according to an embodiment.

FIG. 3 is a flow diagram of an example method 300 of performing inter-lane power management according to an embodiment. As will be described in more detail below, the method 300 generally encompasses redistributing the power saved by turning off predicated lanes.

Accordingly, in step 310, a determination is made whether to implement inter-lane power management. For example, since there is an associated time and power penalty with turning predicated execution lanes off, and then back on when the lanes are active, it may not be desirable to mask those lanes off. That is, it may be determined that the execution lanes are not active long enough to warrant a performance boost that would incur the penalties above. For example, where lanes may be predicted to be active for less than twice the time needed to turn predicated lanes off and back on, (i.e., switch_time), those lanes may not be worthwhile predicating. The switch_time may be measured offline and stored in a read only memory (ROM) or in the basic input/output system (BIOS), where it may be altered by the BIOS or by the operating system (OS).

If inter-lane power management is determined to be implemented, the execution lanes 230 that are to be predicated are determined (step 320). For example, a compiler can supply masks ahead of time to the encoder 210, analogous to a pre-fetch instruction utilized in central processing units (CPUs). However, in the present case, the compiler is prefetching the mask. These masks would indicate which execution lanes 230 are to predicated out during execution. Alternatively, simulated execution runs of GPU kernels may be utilized to identify the expected mask values prior to execution. In another example, a complete frequency schedule may be determined offline and transmitted to the GPU to control runtime power management. That is, the execution history could be examined in order to predict which execution lanes 230 will be predicated out. Compute units (CUs) in the GPU may track performance counters and other information to make predictions about upcoming execution masks, and the safe voltage or frequency necessary to complete the calculations in the active lanes. Once it is known which execution lanes 230 are to be predicated out, a schedule can be determined to predicate out those lanes, and the predicated execution lanes may be downthrottled (step 330). For example, if in step 330, it is determined that execution lanes $L_0$ and $L_N$ will be predicated out, power steering supplies $S_0$ and $S_N$ may be controlled to reduce the power and/or frequency to those respective execution lanes, in order to save power.

As it may take multiple clock cycles to change the frequency or voltage of an execution lane 230, the upcoming predicted activity may be used in order to reduce the number of frequency change events. For example, if a predicated execution lane 230 is to be active for less than some percentage threshold of a predetermined time, multiple parallel threads may be rescheduled together in the same execution lane 230 to take advantage of running at a lower power or frequency. Critical threads may be detected beforehand and exempted from this optimization. Alternatively, the predication of execution lanes 230 may include the information about the distribution of instructions within a thread over time. That is, if the thread is deemed mostly inactive, (subject to the above threshold), the lane consolidation may use the distribution data to match the threads with complementary execution profiles. Once the lanes that are determined to be predicated out have been dethrottled, the power and/or frequency from those lanes may be redistributed to active execution lanes (step 340). Continuing with the example described above in step 330, the power and/or frequency from predicated execution lanes $L_0$ and $L_N$ is redistributed to the active execution lanes, (e.g., $L_1$), to improve the performance in those lanes. The power may be redistributed evenly, (i.e., each active lane receives the same redistribution), or the power may be redistributed unevenly, with some active lanes received a larger portion of the power from the predicated lanes than others.

For example, if one or more active execution lanes 230 is performing latency critical computations, those execution lanes may have more power steered to them than other active execution lanes performing less latency critical computations. This may be achieved by tracking the performance stall cycles to detect which active lanes may benefit from an increase power boost than others. For example, performance counters (registers) that track the properties of running workloads, (e.g., stalls), may be included within a processing unit or compute unit's logic.

It should be understood that many variations are possible based on the disclosure herein. Although features and elements are described above in particular combinations, each feature or element may be used alone without the other features and elements or in various combinations with or without other features and elements.

For example, the power steering may also be implemented at coarse granularities such as GPU SIMDs or even GPU/accelerated processing unit (APU) CUs. Coarse granularity power steering may allow accelerating compute-bound parts of and application by borrowing power from memory bandwidth bound parts in real time. That is, instead of steering power to individual lanes, the power may be distributed between multiple SIMDs or CUs.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
de-energizing one or more of a first plurality of execution lanes upon a determination that the one or more of the first plurality of execution lanes are to be predicated, wherein the de-energizing is performed when the one or more of the lanes of the first plurality of execution lanes are predicted to be active an amount that exceeds a pre-defined threshold; and
redistributing energy from the predicated execution lanes to one or more of a second plurality of active execution lanes, wherein one of more lanes of the second plurality of active execution lanes performing latency critical computations are redistributed with more energy than one or more lanes of the second plurality of active execution lanes that are not performing latency critical computations.

2. The method of claim 1 wherein redistributing the energy includes redistributing power.

3. The method of claim 1 wherein redistributing the energy includes increasing clock frequency to the one or more active execution lanes.

4. The method of claim 1 wherein the energy is redistributed evenly among all active execution lanes when all lanes of the second plurality of active execution lanes are performing latency critical computations.

5. An apparatus comprising:
a plurality of execution lane circuits;
an encoder; and
one or more power steering supplies;
wherein the encoder is configured to control the one or more power steering supplies to de-energize one or more of a first plurality of the execution lane circuits upon a determination that the one or more execution lane circuits are to be predicated, wherein the de-energizing is performed when the one or more of the execution lane circuits of the first plurality of execution lanes are predicted to be active an amount that exceeds a pre-defined threshold, and to redistribute energy from the predicated execution lane circuits to one or more of a second plurality of active execution lane circuits, wherein one of more execution lane circuits of the second plurality of active execution lane circuits performing latency critical computations are redistributed with more energy than one or more execution lane circuits of the second plurality of active execution lane circuits that are not performing latency critical computations.

6. The apparatus of claim 5 wherein the encoder is configured to redistribute power.

7. The apparatus of claim 5 wherein the encoder is configured to increase clock frequency to the one or more active execution lane circuits.

8. The apparatus of claim 5 wherein the energy is redistributed evenly among all active execution lane circuits when all lanes of the second plurality of active execution lane circuits are performing latency critical computations.

9. A non-transitory computer-readable medium, having instructions recorded thereon that, when executed by a computing device, cause the computing device to perform operations comprising:
de-energizing one or more of a first plurality of execution lanes upon a determination that the one or more of the first plurality of execution lanes are to be predicated, wherein the de-energizing is performed when the one or more of the lanes of the first plurality of execution lanes are predicted to be active an amount that exceeds a pre-defined threshold; and
redistributing energy from the predicated execution lanes to one or more of a second plurality of active execution lanes, wherein one of more lanes of the second plurality of active execution lanes performing latency critical computations are redistributed with more energy than one or more lanes of the second plurality of active execution lanes that are not performing latency critical computations.

10. The non-transitory computer-readable medium of claim 9 wherein redistributing the energy includes redistributing power.

11. The non-transitory computer-readable medium of claim 9 wherein redistributing the energy includes increasing clock frequency to the one or more active execution lanes.

12. The non-transitory computer-readable medium of claim 9 wherein the energy is redistributed evenly among all active execution lanes when all lanes of the second plurality of active execution lanes are performing latency critical computations.

* * * * *